US011466742B2

(12) United States Patent
Kirkbride

(10) Patent No.: US 11,466,742 B2
(45) Date of Patent: Oct. 11, 2022

(54) ACTIVE COOLING SYSTEM FOR LANDING GEAR BRAKES

(71) Applicant: The Boeing Company, Chicago, IL (US)

(72) Inventor: David W. Kirkbride, Allyn, WA (US)

(73) Assignee: The Boeing Company, Chicago, IL (US)

( * ) Notice: Subject to any disclaimer, the term of this patent is extended or adjusted under 35 U.S.C. 154(b) by 252 days.

(21) Appl. No.: 16/777,232

(22) Filed: Jan. 30, 2020

(65) Prior Publication Data

US 2021/0239173 A1  Aug. 5, 2021

(51) Int. Cl.
| | |
|---|---|
| *F16D 65/847* | (2006.01) |
| *F16D 65/853* | (2006.01) |
| *F16D 55/36* | (2006.01) |
| *B64C 25/44* | (2006.01) |
| *B64D 37/32* | (2006.01) |
| *F16D 65/78* | (2006.01) |

(52) U.S. Cl.
CPC .......... *F16D 65/853* (2013.01); *B64C 25/44* (2013.01); *B64D 37/32* (2013.01); *F16D 55/36* (2013.01); *F16D 2065/783* (2013.01); *F16D 2065/786* (2013.01); *F16D 2065/787* (2013.01)

(58) Field of Classification Search
CPC .. F16D 65/853; F16D 55/36; F16D 2065/783; F16D 2065/786; F16D 2065/787; F16D 65/847
See application file for complete search history.

(56) References Cited

U.S. PATENT DOCUMENTS

| | | | | | |
|---|---|---|---|---|---|
| 3,251,437 | A | * | 5/1966 | Moyer ..................... | F16D 55/40 188/264 AA |
| 3,664,467 | A | * | 5/1972 | Lucien ................... | F16D 65/847 188/71.6 |
| 9,242,739 | B2 | * | 1/2016 | Martin .................. | B60T 8/1703 |
| 9,573,567 | B2 | * | 2/2017 | Kirkbride ............. | F16D 65/847 |
| 9,623,982 | B2 | * | 4/2017 | Sharma .................. | B64D 37/32 |
| 9,963,239 | B2 | * | 5/2018 | Fukuda ................ | G05D 7/0635 |
| 10,935,093 | B2 | * | 3/2021 | Hosamane ........... | B64D 13/006 |
| 11,125,294 | B2 | * | 9/2021 | Cocks ..................... | F16D 55/36 |

(Continued)

*Primary Examiner* — Thomas W Irvin
(74) *Attorney, Agent, or Firm* — McDonnell Boehnen Hulbert & Berghoff LLP

(57) ABSTRACT

A brake assembly for landing gear of an aircraft includes a caliper member and a carrier member. The caliper member includes a gas inlet configured to receive a cooling gas supplied by an on board fuel inerting gas supply system of the aircraft, and a manifold fluidly coupled to the gas inlet. The manifold is configured to distribute the cooling gas to one or more outlet ports of the caliper member. The carrier member is configured to be coupled to the caliper member. The carrier member includes a cylindrical section configured to receive a stacked arrangement of stators and rotors. The cylindrical section defines one or more interior passages configured to fluidly couple the outlet ports of the caliper member to one or more outlet ports of the cylindrical section. The outlet ports of the cylindrical section are arranged proximate the stacked arrangement of stators and rotors to facilitate forced convective cooling of the stacked arrangement of stators and rotors with the cooling gas supplied by the on board fuel inerting gas supply system.

20 Claims, 8 Drawing Sheets

(56) References Cited

U.S. PATENT DOCUMENTS

| | | | |
|---|---|---|---|
| 2004/0226438 A1* | 11/2004 | Jones | B64D 10/00 |
| | | | 95/45 |
| 2011/0147519 A1* | 6/2011 | Scott | F16D 65/0025 |
| | | | 244/110 A |
| 2014/0239121 A1* | 8/2014 | Kirkbride | B60T 5/00 |
| | | | 244/103 R |
| 2014/0345991 A1* | 11/2014 | Zywiak | F16D 65/78 |
| | | | 188/264 R |
| 2019/0301554 A1* | 10/2019 | Hosamane | F16D 65/847 |
| 2020/0239130 A1* | 7/2020 | She | F16D 55/36 |
| 2020/0300321 A1* | 9/2020 | Cocks | B64C 25/42 |

* cited by examiner

ACTIVE COOLING SYSTEM FOR LANDING GEAR BRAKES

FIELD

This application generally relates to aircraft landing gear brakes. In particular, this application describes an active cooling system for landing gear brakes.

BACKGROUND

Brakes on large aircraft undergo a tremendous temperature increase when landing. As the temperature of the brakes increase, the effectiveness of the brakes decreases due to the phenomena known as brake fade. After the aircraft comes to a stop, the temperature of the brakes gradually drops to the temperature of the ambient air surrounding the brakes.

Certain aircraft regulations require the temperature of aircraft brakes to be below an upper threshold temperature before taking off from a runway to ensure minimum brake effectiveness during, for example, an aborted takeoff procedure. The regulations may specify the amount of time the aircraft is required to be stationary before taking off. The required stationary time gives the brakes ample time cool to a point where they will be effective. The time required for the aircraft brakes to cool down can impact the turnaround time of the aircraft and, therefore, the scheduling of the aircraft.

SUMMARY

In a first aspect, a brake assembly for landing gear of an aircraft is disclosed. The brake assembly includes a caliper member and a carrier member. The caliper member includes a gas inlet configured to receive a cooling gas, and a manifold fluidly coupled to the gas inlet. The manifold is configured to distribute the cooling gas to one or more outlet ports of the caliper member. The carrier member is configured to be coupled to the caliper member. The carrier member includes a cylindrical section configured to receive a stacked arrangement of stators and rotors. The cylindrical section defines one or more interior passages configured to fluidly couple the outlet ports of the caliper member to one or more outlet ports of the cylindrical section. The outlet ports of the cylindrical section are arranged proximate the stacked arrangement of stators and rotors to facilitate cooling the stacked arrangement of stators and rotors with the cooling gas.

In a second aspect, a braking system for an aircraft is disclosed. The braking system includes a supply line fluidly coupled to an on-board inert gas generation system. The brake assembly is fluidly coupled to the supply line. The brake assembly is cooled by inert gas communicated via the supply line from the on-board inert gas generation system. For example, the brake assembly can be force convection cooled by the flowing of inert gas over the brake assembly.

In a third aspect, an aircraft is disclosed. The aircraft includes an on-board inert gas generation system, and a brake assembly for landing gear of the aircraft. The brake assembly is fluidly coupled to the on-board inert gas generation system and is configured to be cooled by inert gas generated by the on-board inert gas generation system. For example, the brake assembly can be force convection cooled by the flowing of inert gas over the brake assembly.

In a fourth aspect, a method for lowering the temperature of a brake assembly of landing gear of an aircraft is provided. The method includes measuring a temperature of the brake assembly of the aircraft; responsive to the temperature being above an upper threshold, opening a control valve to allow inert gas from an on-board fuel inerting gas supply system of the aircraft to flow to the brake assembly; and responsive to the temperature being at or below a lower temperature threshold, closing the control valve to cease the flow of the inert gas to the brake assembly.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

DETAILED DESCRIPTION

Figure 1:
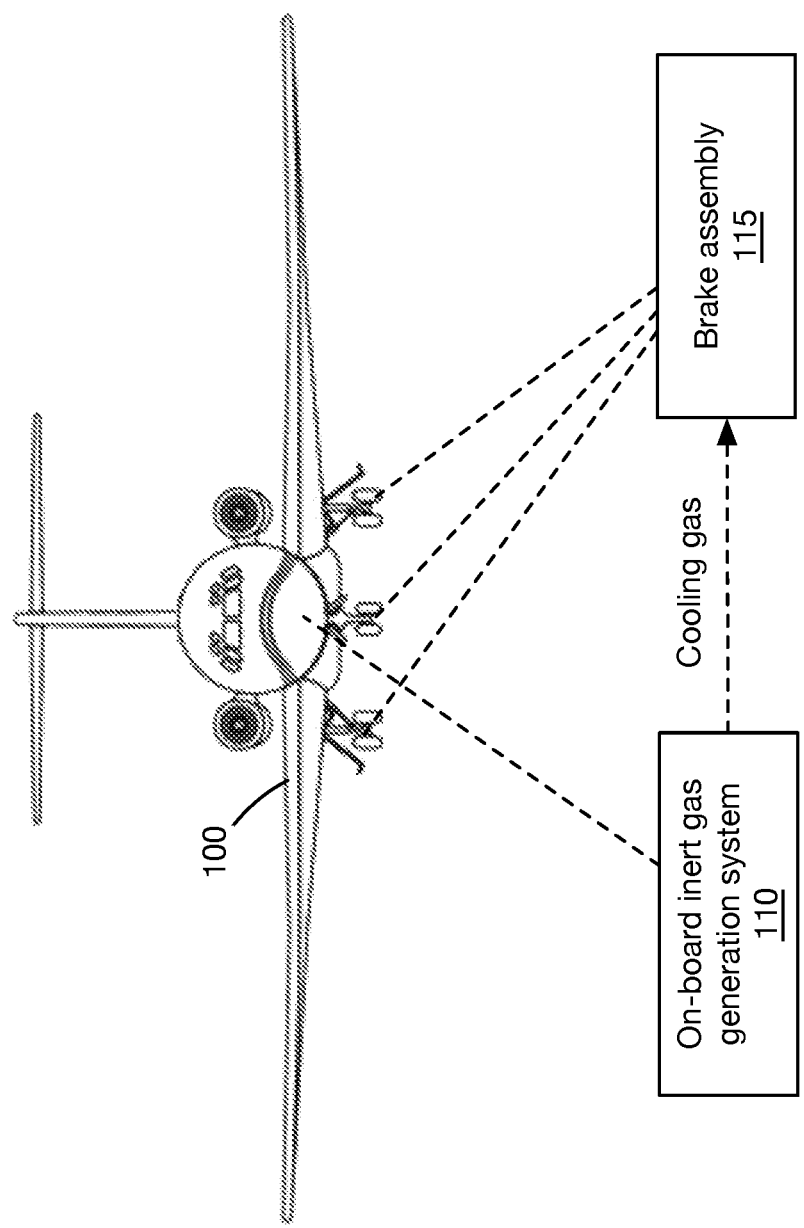
FIG. 1 illustrates an aircraft, in accordance with an example.

Various examples of systems, devices, and/or methods are described herein. Words such as "example" and "exemplary" that may be used herein are understood to mean "serving as an example, instance, or illustration." Any implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those of ordinary skill in the art, may occur in amounts that do not preclude the effect the characteristic was intended to provide.

To the extent that terms "includes," "including," "has," "contains," and variants thereof are used herein, such terms are intended to be inclusive in a manner similar to the term "comprises" as an open transition word without precluding any additional or other elements.

Introduction

As noted above, certain aircraft regulations require the temperature of aircraft brakes to be below an upper threshold temperature before taking off from a runway to ensure minimum brake effectiveness during, for example, an aborted takeoff procedure. The regulations may specify the amount of time the aircraft is required to be in a brake cool down mode before taking off. The required cool downtime gives the brakes ample time cool to a point where they will be effective. The required cool downtime can adversely impact the turnaround time of the aircraft and, therefore, the scheduling of the aircraft.

Certain examples disclosed herein are directed to a brake assembly for landing gear. The brake assembly is actively cooled with air generated by an on-board fuel inerting gas supply system of the aircraft. Active cooling of the brake assembly reduces the amount of time needed to lower the temperature of the brake assembly. The shorter time reduces the turnaround time of the aircraft and, therefore, can relax scheduling constraints imposed on the aircraft.

In one example, the brake assembly includes a caliper member and a carrier member. The caliper member and the carrier member include hollow channels configured to route cooling gas received from an on-board fuel inerting gas supply system of the aircraft over a stacked arrangement of stators and rotors of the brake assembly. Routing of the cooling gas facilitates forced convective cooling the stacked arrangement of stators and rotors.

A further advantage of the system above is that the use of an inerting gas system for forced convective cooling of the brake assembly also adds fire suppression and may also reduce Thermal Carbon Brake Catalytic Oxidation. That is, increased rake life can result from using the nitrogen from the inerting gas system.

FIG. 1 illustrates an aircraft 100. The aircraft 100 includes an on-board inert gas generation system (OIGS) 110 and a brake assembly 115 for landing gear of the aircraft 100.

The OIGS 110 may correspond to a gas generation system that generates an inert gas for displacing gas vapors within the fuel tanks of the aircraft 100. For example, the OIGS 110 may incorporate a hollow fiber membrane material configured to separate air supplied to the fiber membrane into nitrogen-enriched air (NEA) and oxygen-enriched air (OEA). The nitrogen-enriched air may be pumped into the fuel tanks to lower the concentration of oxygen within the fuel tanks to the point where the combustion of fuel vapor is minimized. For example, the nitrogen-enriched air may have an oxygen level of less than 12%, well below the normal atmospheric oxygen content of 21%.

The brake assembly 115 may be fluidly coupled to the OIGS 110 to receive cooling gas from the OIGS 110 for cooling parts of the brake assembly 115. In this regard, cooling gas may be applied to the brake assembly 115 while the brake assembly 115 is slowing the aircraft 100 and/or during flight. For example, the cooling gas may be applied to the brake assembly 115 while the landing gear is stowed within the aircraft 100.

In some examples, the cooling gas may be applied to the brake assembly 115 when the temperature of the brake assembly 115 is above an upper threshold temperature, such as, for example, 400 degrees Fahrenheit. In some examples, the flow of cooling gas to the brake assembly 115 may be controlled to cease when the temperature of the brake assembly 115 is at or below a lower threshold temperature, such as, for example, 186 degrees Fahrenheit. Other thresholds can be used.

The aircraft 100 may include multiple brake assemblies 115 that are fluidly coupled to the OIGS 110. For example, one or more of the brake assemblies in the landing gear proximate the wings and forward section of the aircraft 100 may be fluidly coupled to the OIGS 110 to receive cooling gas from the OIGS 110 for cooling parts of the respective brake assemblies 115

In an example, the aircraft 100 may correspond to a large commercial passenger jet. It should be noted that while the examples described herein may be described in connection with a commercial passenger jet, the examples may be adapted for use in other types of aircraft 100. For example, the examples may be utilized in other aircraft 100 that would benefit from brake assembly 115 cooling and/or that include a source of cooling gas such as the OIGS 110 described above.

Figure 2:
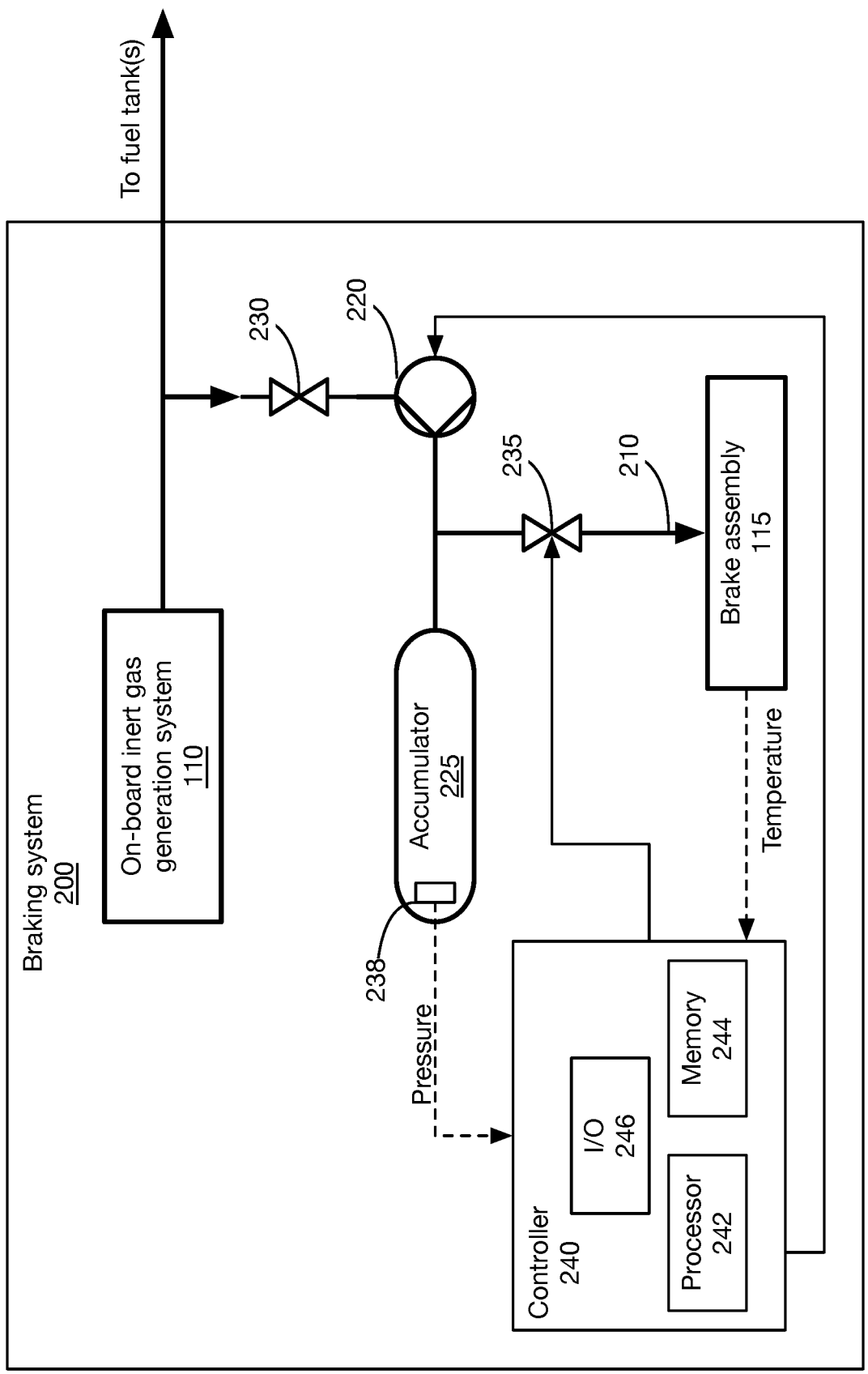
FIG. 2 is a schematic diagram of a braking system that may be utilized on the aircraft of FIG. 1, in accordance with an example.

FIG. 2 illustrates a schematic diagram of a braking system 200 that may be utilized on the aircraft 100 of FIG. 1. As shown, the braking system 200 includes an OIGS 110, a supply line 210, and a brake assembly 115 for landing gear of the aircraft 100. The OIGS 110 and brake assembly 115 may correspond to the OIGS 110 and brake assembly 115 described above. In some examples of the braking system 200, the braking system 200 further includes a pump 220, an accumulator 225, a check valve 230, a control valve 235, and a controller 240.

In an example of the braking system 200, the pump 220 may be downstream of and in fluid communication with the OIGS 110, and the accumulator 225 may be downstream of the pump 220. The pump 220 may be configured to pressurize the inert gas. The accumulator 225 may be configured to store pressurized inert gas that is pressurized by the pump 220.

In another example of the braking system 200, the OIGS 110 may be fluidly coupled to the check valve 230. The check valve 230 may be fluidly coupled to the pump 220. The pump 220 may be fluidly coupled to the accumulator 225 and the control valve 235. The control valve 235 may be fluidly coupled to the brake assembly 115.

An example of the pump 220 may be configured to pressurize the inert gas. For example, the pump 220 may be configured to receive inert/cooling gas at a pressure of between Ambient and 15 psi above ambient pressure and to pressurize the cooling gas to a pressure of between 0.0 psig and 2200 psig above ambient pressure for accumulator charging. An example of the pump 220 may correspond to an electric pump. The pump 220 may include a cylinder and a piston arranged within the cylinder. The pump 220 may include an inlet for receiving the cooling gas at a first pressure and an outlet for outputting the cooling gas at a second, higher pressure. The pump 220 may include an electric motor to drive the piston to pressurize the cooling gas. The electric motor may be actuated via a control signal communicated from, for example, the controller 240.

An example of the accumulator 225 may be formed from a material such as steel, carbon fiber, a polymer material, etc. suitably dimensioned to facilitate storing the cooling gas at the desired pressure range. The accumulator 225 may include a pressure gauge. The pressure gauge may output an analog signal or a digital signal having a value that is proportional to the pressure of the cooling gas stored within the accumulator 225. The accumulator 225 may be configured to store between 10.0 and 18.0 liters of inert cooling gas pressurized up to 1800 psig above ambient pressure. The accumulator 225 may be configured to store enough cooling gas and at a high enough pressure to facilitate providing cooling gas to the brake assembly 115 at a rate of between 30 CFM and 35 CFM for at least 6 minutes at 3 psig above ambient.

In some examples of the braking system 200, a single accumulator 225 and pump 220 may be utilized to pressurize and store pressurized cooling gas for more than one brake assembly 115 of the aircraft 100. In other examples, separate pumps 220 and/or accumulators 225 may be provided for each brake assembly 115.

The check valve 230 may be configured to allow cooling gas to flow from the OIGS 110 to the pump 220 and to prevent the flow of cooling gas in the opposite direction. One example of the check valve 230 may correspond to a ball check valve in which the closing member, the movable part to block the flow, is a ball. The ball may be spring-loaded to urge the ball towards a closed position (i.e., to prevent fluid flow through the check valve 230.) The check valve 230 may have a generally conical/tapered interior surface to guide the ball into a position where the ball forms a positive seal with the interior surface of the check valve 230 and prevents the reverse flow of gas.

The control valve 235 may be configured to control the flow of cooling gas to the brake assembly 115 responsive to an actuation signal. An example of the control valve 235 may correspond to a ball valve. The ball may be seated within the housing of the valve. The ball may have an opening formed through its center. The ball may be turned to a first position to allow gas to flow through the valve and turned to a section position to prevent the flow of gas through the valve. An actuator may be coupled to the ball to turn the ball responsive to a control signal communicated from, for example, the controller 240. The actuator may be controlled to cause the ball to move between opening and closed states or may be controlled to cause the ball to move to an intermediate/partially opened state.

The actuation signal may be generated by the controller 240 responsive to a temperature reading taken from the brake assembly 115. For example, one or more temperature probes 422 may be coupled to the brake assembly 115 for reading the temperature of the brake assembly 115. In this regard, an example of the temperature probe 422 may output an analog signal or a digital signal having a value that is proportional to the temperature of the brake assembly 115. Another example of the temperature probe 422 may output a signal indicative of whether the brake assembly 115 is above the upper threshold temperature.

The controller 240 may include a processor 242, a memory 244, and an input/output (I/O) interface 246. The memory 244 may include instruction code that is executable by the processor 242 to facilitate performing, by the controller 240, various operations described herein. The I/O interface 246 may include ports to control the various elements described above. For example, the I/O interface 246 may include an output port that facilitates controlling the control valve 235 to fully or partially open, and to close. A further output port may facilitate activating the pump 220 to pressurize the accumulator 225. The I/O interface 246 may include one or more input ports for receiving signals from one or more temperature probes 422 of the brake assembly 115. A further input port may receive signals from a pressure sensor 238 of the accumulator 225.

In operation, the controller 240 may be configured to cause the control valve 235 to open and allow cooling gas to flow from the accumulator 225 to the brake assembly 115 when the temperature of the brake assembly 115 is above an upper temperature threshold such as, for example, 400 degrees Fahrenheit. The controller 240 may be further configured to cause the control valve 235 to close to prevent cooling gas from flowing from the accumulator 225 to the brake assembly 115 when the temperature of the brake assembly 115 is below a lower temperature threshold such as, for example, 186 degrees Fahrenheit. Other thresholds can be used.

In a further operation, the controller 240 may be configured to activate the pump 220 when the pressure of the cooling gas in the accumulator 225 falls below a threshold. The controller 240 may be configured to deactivate the pump 220 when the pressure of the cooling gas in the accumulator 225 reaches the threshold.

Figure 3:
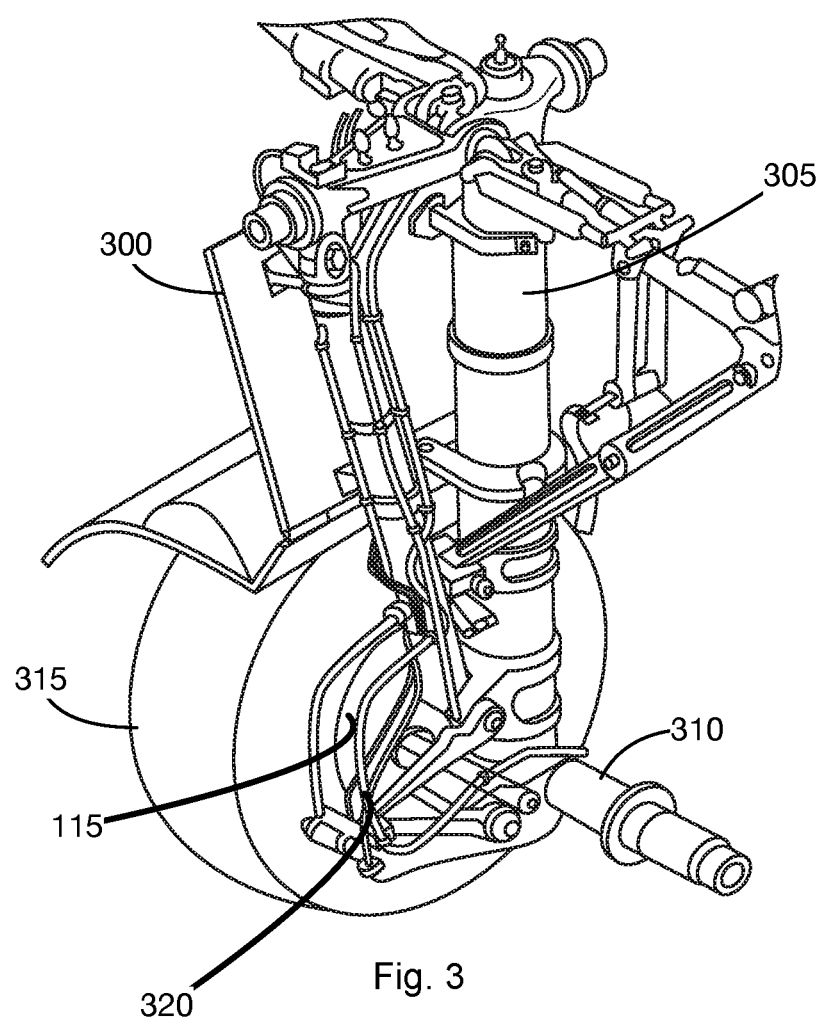
FIG. 3 illustrates a portion of landing gear of the aircraft, in accordance with an example.

FIG. 3 illustrates a portion of an example of landing gear 300 of the aircraft 100. Shown are a strut assembly 305, an axle 310, a wheel 315, gas tubing 320, and a brake assembly 115. A second wheel is not shown to facilitate viewing certain aspects of the landing gear 300.

The strut assembly 305 may be coupled to a structure within the aircraft 100, such as a landing gear actuator that deploys and retracts the landing gear 300. The axle 310 may be transversely arranged at a bottom end of the strut assembly 305 and may be configured to pass through the brake assembly 115 to secure the wheel 315 to the brake assembly 115.

The gas tubing 320 may run along a section of the strut assembly 305 and may fluidly couple the OIGS 110 to the brake assembly 115. For example, the gas tubing 320 may be coupled to the control valve 235 of FIG. 2. In this regard, the gas tubing 320 may include fittings on either end that facilitate coupling the gas tubing 320 to the control valve 235 and the brake assembly 115.

Figure 4:
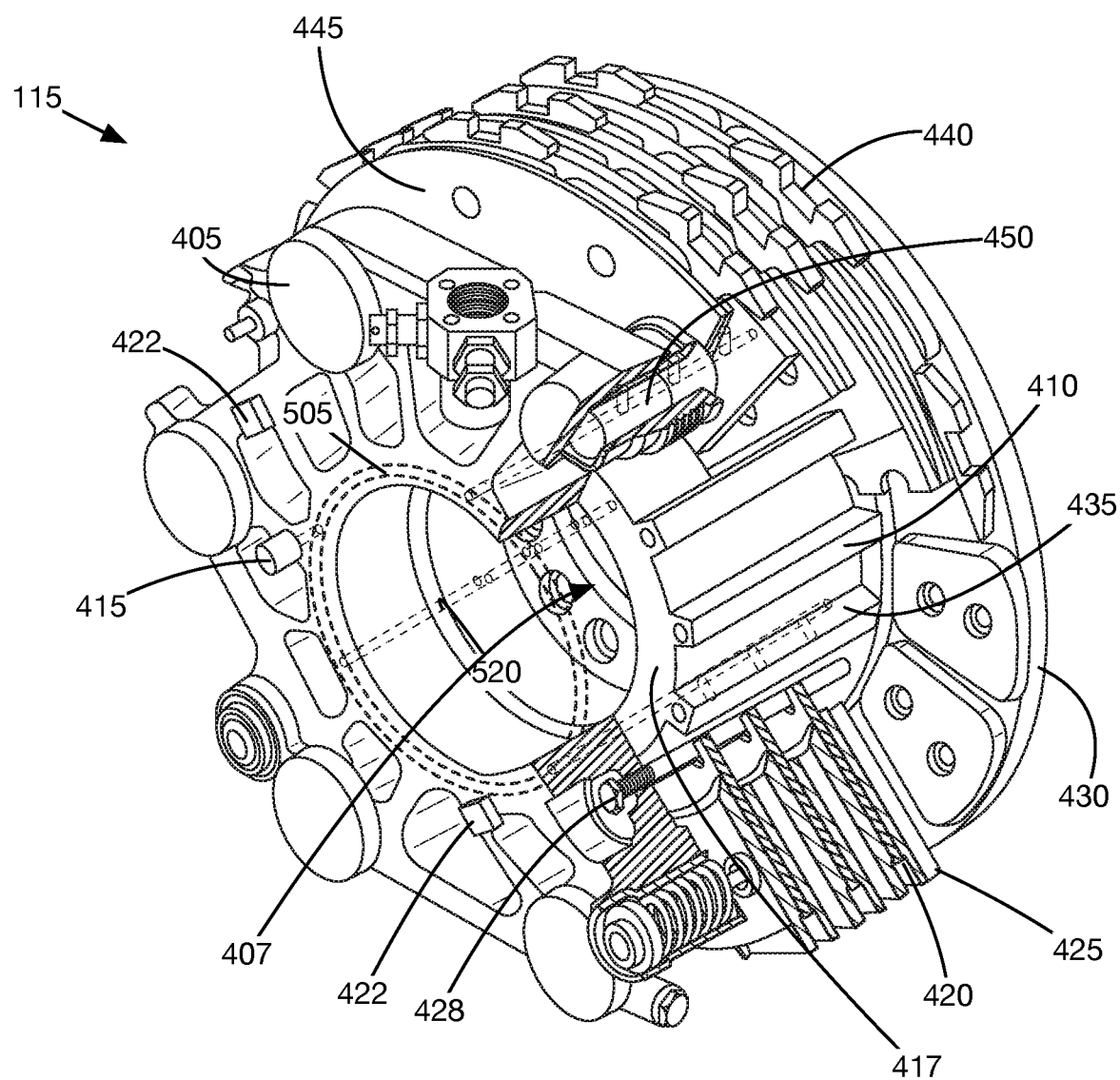
FIG. 4 illustrates a brake assembly of the aircraft, in accordance with an example.

FIG. 4 illustrates an example of the brake assembly 115 of the aircraft 100. The brake assembly 115 includes a caliper member 405 and a carrier member 410. As described in more detail below, the caliper member 405 includes a manifold 505, and the carrier member 410 includes a group of inner passages 520 fluidly coupled to the manifold 505. In FIG. 4, the manifold 505 and inner passages 520 are represented in dashed lines.

In some examples, the caliper member 405 is configured to remain stationary. That is, the caliper member 405 does not rotate with the wheel 315. In this regard, the caliper member 405 may be fixed to the strut assembly 305 of the landing gear 300 by way of the carrier member 410 and the axle 310 of the strut assembly 305. For example, the carrier member 410 may be fastened via bolts 428 to the caliper member 405. The axle 310 may extend through a central opening 407 in the carrier member 410 for receiving the axle 310, and a nut may be turned on an end of the axle 310 to secure the carrier member 410 and therefore, the caliper member 405 to the axle.

Figure 5A:
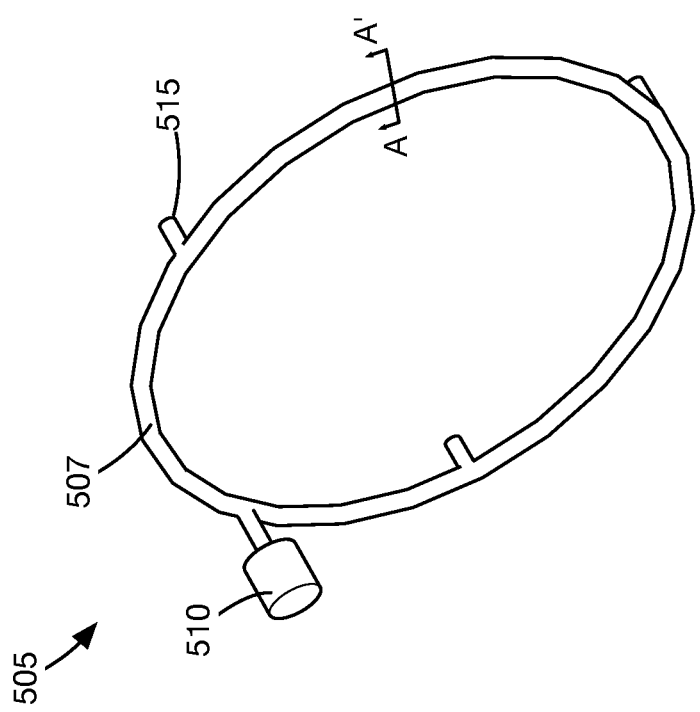
FIG. 5A illustrates a manifold of a caliper member of the brake assembly, in accordance with an example.

The caliper member 405 includes a gas inlet 415 configured to receive a cooling gas and a manifold (505, FIG. 5A)

fluidly coupled to the gas inlet 415. In some examples, the gas inlet 415 may include a fitting configured to couple to a fitting of the gas tubing 320. The manifold 505 is configured to distribute the cooling gas to one or more outlet ports (515, FIG. 5A) of the caliper member 405.

An example of the caliper member 405 may define one or more cylindrical cavities, and a corresponding number of pistons disposed with the cylindrical cavities. The caliper member 405 may include an inlet port for receiving a hydraulic fluid. The caliper member 405 may define an interior passageway (not shown) for fluidly communicating the hydraulic fluid to the pistons.

The caliper member 405 may include a pressure plate 445 to evenly distribute pressure, applied by the pistons during activation of the brakes, to an arrangement of stacked stators 420 and rotors 425. The caliper member 405 may include one or more return springs, coupled to the pressure plate 445, to urge the pistons back into the cylindrical cavities. In operation, hydraulic fluid may be applied under pressure to the caliper member 405 and may cause extension of the pistons against the pressure plate 445. Extension of the pistons causes the pressure plate 445 to apply pressure against the arrangement of stacked stators 420 and rotors 425. When the pressure is released, the pistons are urged back into the cavities via the force applied by the return springs.

The carrier member 410 is configured to be coupled to the caliper member 405. The carrier member 410 includes a cylindrical section 417. In some examples, the carrier member 410 includes a backing plate 430. The carrier member 410 may be fastened to the caliper member 405 via one or more bolts that extend from the caliper member 405 to the backing plate 430 of the carrier member 410.

The cylindrical section 417 of the carrier member 410 is configured to receive a stacked arrangement of stators 420 and rotors 425. In one example, the stacked arrangement of stators 420 and rotors 425 is arranged between the pressure plate 445 of the caliper member 405 and the backing plate 430 of the brake assembly 115.

The stators 420 are held stationary relative to the cylindrical section 417 by way of a group of slots 435 arranged around the outside of the cylindrical section 417. The group of slots 435 arranged around the outside of the cylindrical section 417 interlock with complementary slots defined by the stators 420.

The rotors 425 are configured to rotate with rotation of the wheel 315, relative to the cylindrical section 417. In this regard, the inside surface of the rim of the wheel 315 may define a group of slots configured to interlock with complementary slots 440 defined on the outer edges of the rotors 425.

During braking operations, the wheel 315 may initially be rotating relative to the cylindrical section 417, and, therefore, the rotors 425 may be rotating about the cylindrical section 417. One or more pistons 450 within the caliper member 405 may apply pressure against the pressure plate 445. The pressure plate 445, in turn, distributes/applies the pressure against the stacked arrangement of stators 420 and rotors 425, thereby compressing the stacked arrangement of stators 420 and rotors 425 between the pressure plate 445 and the backing plate 430. The compression can result in an immense amount of friction being formed between the rotating rotors 425 and the stationary stators 420.

In some examples, the stators 420 and rotors 425 are constructed from a material suitable at withstanding temperatures of up to 1800 degrees Fahrenheit. For example, the stators 420 and rotors 425 may have a central steel core that is covered with a ceramic material capable of withstanding the friction generated between the stators 420 and rotors 425. The frictional force generated between the stators 420 and rotors 425 may decrease with an increase in temperature of the stators 420 and rotors 425. For example, at a temperature of 800 degrees Fahrenheit, the braking capacity available of the stators 420 and rotors 425 may be reduced by 50% to 60%.

The cylindrical section 417 of the carrier member 410 defines one or more interior passages (520, FIG. 5B) configured to fluidly couple the one or more outlet ports (515, FIG. 5B) of the caliper member 405 to one or more outlet ports (525, FIG. 5B) of the cylindrical section 417. The outlet ports 525 of the cylindrical section 417 are arranged proximate the stacked arrangement of stators 420 and rotors 425 to facilitate cooling the stacked arrangement of stators 420 and rotors 425 with the cooling gas.

FIG. 5A illustrates an example of the manifold 505 of the caliper member 405. The manifold 505 includes a main body 507, an inlet port 510, and one or more outlet ports 515. The respective elements of the manifold 505 may correspond to hollow structures. The main body 507, inlet port 510, and outlet ports 515 may be dimensioned to facilitate communicating a quantity of cooling gas sufficient to reduce the temperature of the brake assembly 115. For example, the main body 507 may have a shape that generally matches the shape of the exterior surface of the caliper member 405, such as, for example, a generally circular shape. The main body 507 may extend coaxially about the central opening 407 of the carrier member 410 for receiving the axle 310 of the landing gear 300. The cross-section of the main body 507 may have a diameter of between 0.12 inches and 0.25 inches when measured along section A-A'. The inlet port 510 and outlet ports 515 may be similarly dimensioned.

The inlet port 510 may correspond to or be fluidly coupled to the gas inlet 415 of the brake assembly 115. In this regard, the inlet port 510 may be fluidly coupled to the OIGS 110.

An example of the manifold 505 may be integrally formed within the caliper member 405. For example, the caliper member 405 may be formed via casting process, and the mold utilized to form the caliper member 405 may have defined therein certain features that define the manifold 505 within the caliper.

Another example of the manifold 505 may be a separate component that is fixed externally to the caliper member 405. For example, the manifold 505 may correspond to tubing that is shaped appropriately to generally match the shape of the caliper member 405.

Figure 5B:
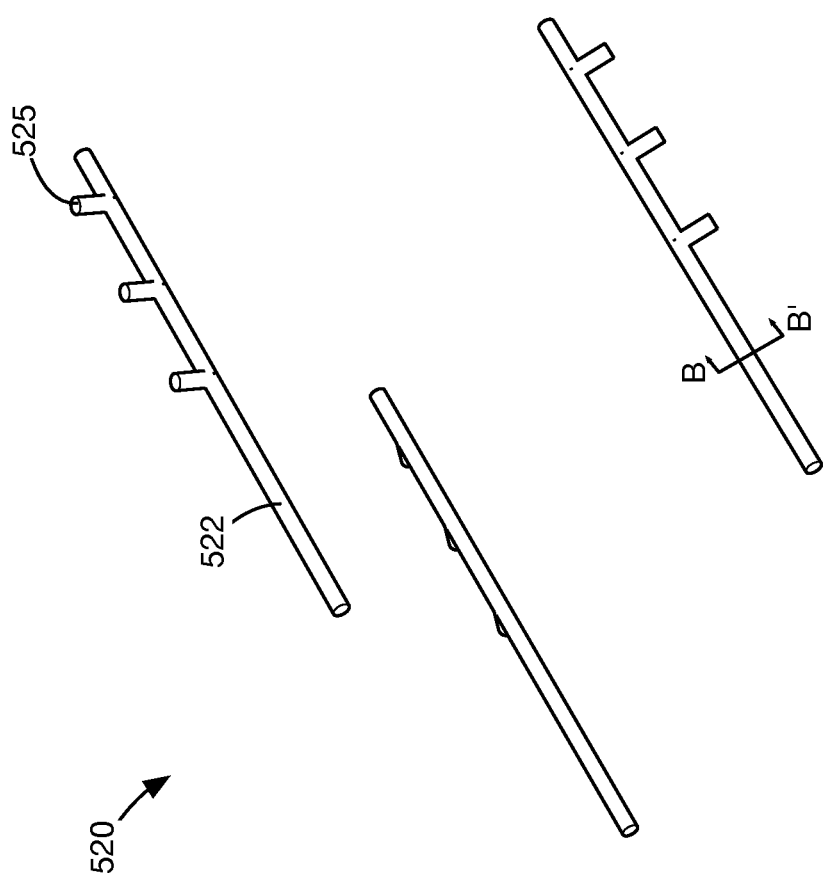
FIG. 5B illustrates interior passages of a carrier member of the brake assembly, in accordance with an example.

FIG. 5B illustrates an example of a group of interior passages 520 of the cylindrical section 417 of the carrier member 410. Referring to FIG. 5B, an interior passage 520 may include a main body 522 and one or more outlet ports 525. The respective elements of the interior passage 520 may correspond to hollow structures. The outlet ports 525 of the cylindrical section 417 can be arranged proximate the stacked arrangement of stators 420 and rotors 425 to facilitate cooling the stacked arrangement of stators 420 and rotors 425 with the cooling gas.

The main body 522 and the outlet ports 525 may be dimensioned to facilitate communicating a quantity of cooling gas sufficient to reduce the temperature of the brake assembly 115. For example, a cross-section of the interior passages 520 may have a diameter of between 0.12 inches and 0.25 inches when measured across section B-B'.

Figure 5C:
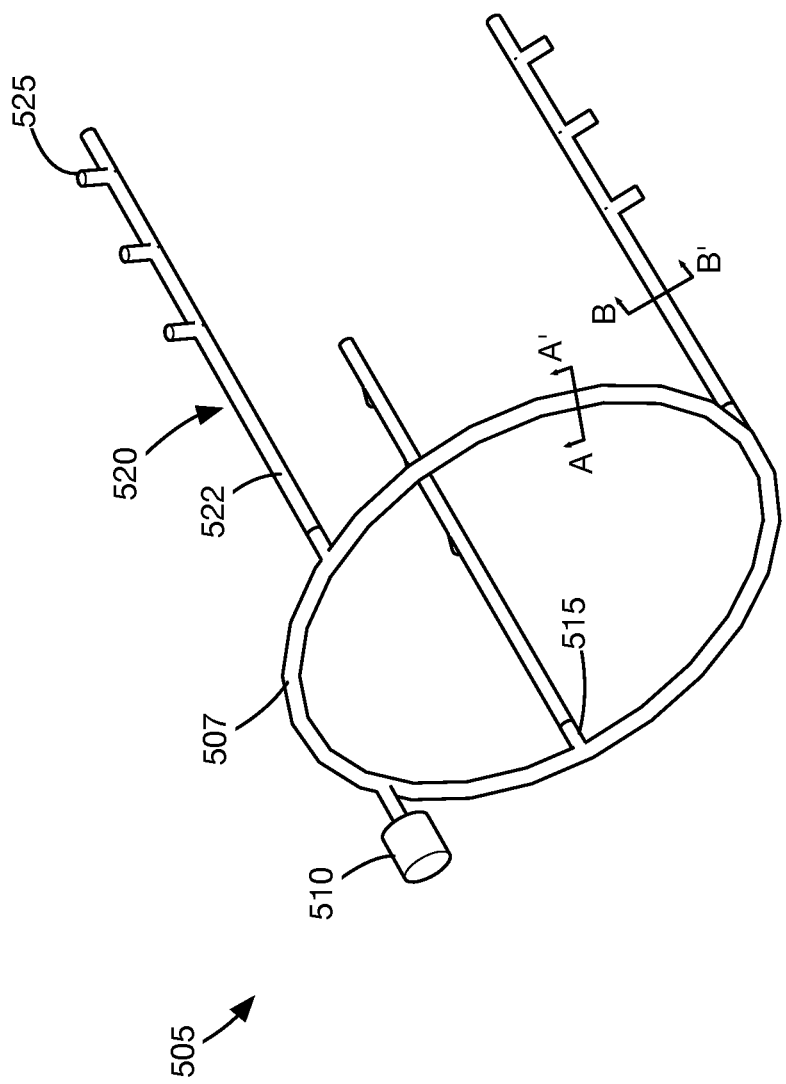
FIG. 5C illustrates coupling of the manifold of the caliper member to the interior passages of the carrier member, in accordance with an example.

FIG. 5C illustrates an example of a fluid coupling between the outlet ports 525 of the cylindrical section 417 of the carrier member 410 and the gas inlet 510 of the caliper member 405. As shown, each of the interior passages 520 of the cylindrical section 417 of the carrier member 410 may line up with an outlet port 515 of the caliper member 405 when the carrier member 410 and the caliper member 405 are fastened together. In some examples, the carrier member 410 may be keyed to the caliper member 405 to prevent misalignment of the interior passages 520 and the outlet ports 515 of the caliper member 405 during assembly. In some examples, a gasket (not shown) can be provided between the interior passages 520 and the outlet ports 515 to form an airtight seal between the interior passages 520 and the outlet ports 515 after assembly.

It should be noted that while the carrier member 410 is depicted as having three inner passages 520, and the caliper member 405 is depicted as having three outlet ports 515, the number of inner passages 520 and outlet ports 515 may be different. For example, in some examples, the carrier member 410 and the caliper member 405 may include more than three inner passages 520 and outlet ports 515, respectively, to facilitate more even application of cooling gas towards the stators and/or rotors.

In addition, while the inner passages 520 and corresponding outlet ports 515 are depicted as being evenly spaced apart, in some examples, the spacing between the inner passages 520 and corresponding outlet ports 515 may be distributed unevenly.

Additionally, while three inner passages 520 are depicted as being fluidly coupled to three distinct outlet ports 515, in some examples, the inner passages 520 may be combined within the carrier member 410, and a single output port 515 may be provided in the caliper member 405 to fluidly communicate cooling gas to the combined inner passages 520.

An example of the interior passage 520 may extend longitudinally through the cylindrical section 417 of the carrier member 410, from the outlet port 515 of the manifold 505 of the caliper member 405 towards the backing plate 430 of the carrier member 410. For example, the main body 522 of the interior passage 520 may be straight and may extend from the face section of the carrier member 410 that mates with the caliper member 405 to just inside of the backing plate 430, without going through the backing plate 430. In another example, the main body 522 of the interior passage 520 may extend through the cylindrical section 417 at an angle such that the interior passage 520 spirals to a degree about the cylindrical section 417.

In an example of the interior passage 520, the outlet ports 525 are distributed along the length of the interior passage 520 at positions proximate the rotors 425 of the stacked arrangement of stators 420 and rotors 425 to facilitate cooling gas flow over each rotor of the stacked arrangement of stators 420 and rotors 425. For example, separate outlet ports 525 may be arranged below the rotors 425 so that cooling gas flowing out of the outlet ports 525 flows over the rotors 425. The outlet ports 525 may be arranged below the stators 420 so that cooling gas flowing out of the outlet ports 525 flows over the stators 420. In some examples, a first interior passage 520 way may have outlet ports 525 arranged below the stators 420 and a second interior passage 520 way have outlet ports 525 arranged below the rotors 425.

In an example of the interior passage 520, the number of outlet ports 525 may correspond to the number of rotors 425 of the stacked arrangement of stators 420 and rotors 425. For example, three outlet ports 525 may be provided on a given interior passage 520 when the stacked arrangement of stators 420 and rotors 425 includes three rotors 425.

An example of an internal passage 520 may be integrally formed within the carrier member 410. For example, the carrier member 410 may be formed via a casting process, and the mold utilized to form the carrier member 410 may have defined therein certain features that define the internal passage 520 within the caliper member 405.

Another example of the internal passage 520 may be a separate component that is fixed externally to the carrier member 410. For example, the internal passage 520 may correspond to tubing that is shaped appropriately to generally match the shape of the carrier member 410.

Figure 6:
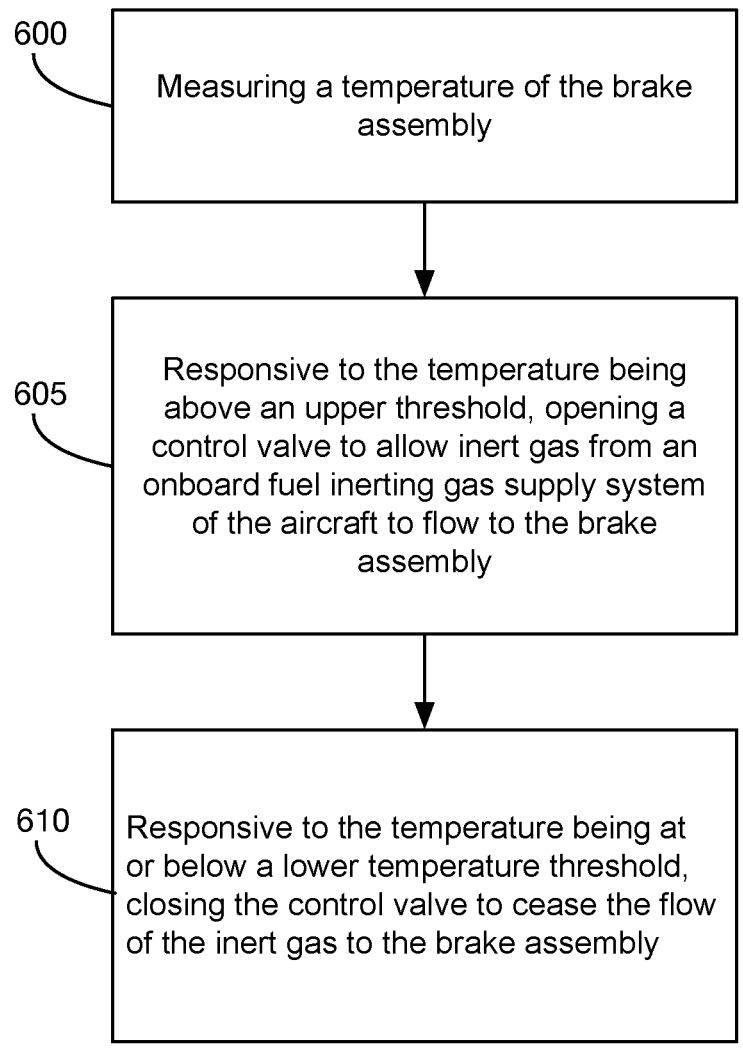
FIG. 6 illustrates a method for lowering the temperature of the brake assembly of landing gear of the aircraft, in accordance with an example.

FIG. 6 illustrates a method for lowering the temperature of a brake assembly 115 of landing gear 300 of an aircraft 100. The operations of the method may be implemented via computer instruction code that may be stored in non-transitory computer-readable media. The instruction code may be executable by a processor 242 to cause the processor 242 to perform the various operations and/or control other systems to perform the various operations. For example, one or more of the operations may be performed by the processor 242 of the controller 240 and/or subsystems of the controller 240.

Block 600 may involve measuring a temperature of the brake assembly 115 of the aircraft. For example, one or more temperature probes 422 may be coupled to the brake assembly 115 for reading the temperature of the brake assembly 115. An example of the temperature probe 422 may output an analog signal or a digital signal having a value that is proportional to the temperature of the brake assembly 115. Another example of the temperature probe 422 may output a signal indicative of whether the brake assembly 115 is above the upper threshold temperature.

Block 605 may involve, responsive to the temperature being above an upper threshold temperature, opening a control valve 235 to allow inert gas from an on-board fuel inerting gas supply system of the aircraft to flow to the brake assembly 115. For example, the control valve 235 may correspond to a ball valve and may include an actuator to open and close the control valve 235 responsive to a control signal communicated from, for example, the controller 240. The actuator may be controlled to cause the ball valve to move to an open state.

Block 610 may involve, responsive to the temperature being at or below a lower temperature threshold, closing the control valve 235 to cease the flow of the inert gas to the brake assembly 115. Following on the example above, the actuator may be controlled, by the controller 240, to cause the ball valve to move to a closed state when the temperature is at or below the lower temperature threshold.

Some examples may involve receiving the cooling gas from an on-board inert gas generation system (OIGS) 110 of the aircraft 100.

Some examples may involve storing the cooling gas received from the OIGS 110 to an accumulator 225 at a pressure between 1800 psig and 2200 psig.

Some examples may involve pressurizing the cooling gas in the accumulator 225 with a pump 220. The pump 220 may be controlled to activate when the pressure in the accumulator 225 is below a pressure threshold and may be controlled to deactivate when the pressure in the accumulator 225 is at the pressure threshold.

Some examples may involve storing between 10 and 18 liters of pressurized inert gas.

Some examples may involve fluidly communicating the cooling gas to the brake assembly 115 at a rate of 30 CFM to 35 CFM for at least 6 minutes at 3 psig above ambient when the control valve 235 is open.

Some examples may involve controlling the control valve 235 to open when the landing gear of the aircraft 100 is deployed and to close the control valve 235 when the landing gear is retracted.

Some examples may involve applying cooling gas to the brake assembly 115 when the temperature of the brake assembly 115 is above an upper threshold temperature and ceasing the flow of cooling gas to the brake assembly 115 when the temperature of the brake assembly 115 is at or below a lower threshold temperature.

Some examples may involve storing the cooling gas received from the OIGS 110 to an accumulator 225 and controlling the control valve 235 to remain closed the pressure of the cooling gas in the accumulator 225 is below a lower pressure threshold.

Some examples may involve pressurizing, by a pump downstream of and in fluid communication with the on-board fuel inerting gas supply system, the inert gas; and storing pressurized inert gas in an accumulator downstream of the pump.

Some examples may involve opening a valve that is downstream of the accumulator and configured to control a flow of the inert gas to the brake assembly to allow the inert gas to flow to the brake assembly when the landing gear of the aircraft is deployed; and closing the valve to prevent the flow of the inert gas to the brake assembly when the landing gear of the aircraft is retracted In some examples, opening the valve may involve communicating the inter gas to the brake assembly at a rate of between 30 CFM to 35 CFM for at least 6 minutes at 3 psig above ambient examples may involve.

Some examples may involve receiving the inert gas at a gas inlet a caliper member; distributing, by a manifold fluidly coupled to the gas inlet, the inert gas to one or more outlet ports of the caliper member; and distributing, by a carrier member coupled to the caliper member, the inert gas to one or more outlet ports of a cylindrical section of the carrier member. In these examples, the cylindrical section is configured to receive a stacked arrangement of stators and rotors. The cylindrical section defines one or more interior passages configured to fluidly couple the one or more outlet ports of the caliper member to the one or more outlet ports of the cylindrical section. The one or more outlet ports of the cylindrical section are arranged proximate the stacked arrangement of stators and rotors to facilitate cooling the stacked arrangement of stators and rotors with the cooling gas.

While the systems and methods of operation have been described with reference to certain examples, it will be understood by those skilled in the art that various changes may be made and equivalents may be substituted without departing from the scope of the claims. Therefore, it is intended that the present methods and systems not be limited to the particular example disclosed, but that the disclosed methods and systems include all embodiments falling within the scope of the appended claims.

What is claimed is:

1. A brake assembly for landing gear of an aircraft, the brake assembly comprising:
   a caliper member that includes:
      a gas inlet configured to receive a cooling gas from an on-board fuel inerting gas supply system of the aircraft; and
      a manifold fluidly coupled to the gas inlet, wherein the manifold is configured to distribute the cooling gas to one or more outlet ports of the caliper member; and
   a carrier member configured to be coupled to the caliper member, wherein the carrier member includes a cylindrical section configured to receive a stacked arrangement of stators and rotors, wherein the cylindrical section defines one or more interior passages configured to fluidly couple the one or more outlet ports of the caliper member to one or more outlet ports of the cylindrical section, wherein the one or more outlet ports of the cylindrical section are arranged proximate the stacked arrangement of stators and rotors to facilitate cooling the stacked arrangement of stators and rotors with the cooling gas.

2. The brake assembly according to claim 1, wherein the caliper member defines a central opening for receiving an axle of the landing gear, wherein the manifold includes an interior passage that extends coaxially about the central opening.

3. The brake assembly according to claim 1, wherein the one or more interior passages extend longitudinally through the cylindrical section from the one or more outlet ports of the manifold of the caliper member towards a backing plate of the carrier member.

4. The brake assembly according to claim 1, wherein a diameter of the one or more interior passages is between 0.12 inches and 0.25 inches.

5. The brake assembly according to claim 1, wherein at least one interior passage of the one or more interior passages of the carrier member includes a plurality of outlet ports, wherein the outlet ports of the plurality are distributed along a length of the at least one interior passage at positions proximate the rotors of the stacked arrangement of stators and rotors to facilitate cooling gas flow over each rotor of the stacked arrangement of stators and rotors.

6. The brake assembly according to claim 5, wherein a number of outlet ports of the at least one interior passage corresponds to a number of rotors of the stacked arrangement of stators and rotors.

7. The brake assembly according to claim 1, wherein the cooling gas is an inert gas.

8. A braking system for an aircraft, the braking system comprising:
   a supply line fluidly coupled to an on-board inert gas generation system;
   a brake assembly for landing gear of the aircraft fluidly coupled to the supply line, wherein the brake assembly is configured to be cooled by inert gas communicated via the supply line from the on-board inert gas generation system;
   a pump downstream of and in fluid communication with the on-board inert gas generation system, wherein the pump is configured to pressurize the inert gas; and
   an accumulator downstream of the pump, wherein the accumulator is configured to store pressurized inert gas.

9. The braking system according to claim 8, wherein the pump is configured to pressurize the inert gas to between 0.0 psig and 2200 psig above ambient pressure.

10. The braking system according to claim 8, wherein the accumulator is configured to store between 10 and 18 liters of pressurized inert gas.

11. The braking system according to claim 8, further comprising a control valve downstream of the accumulator to control a flow of cooling gas to the brake assembly.

12. The braking system according to claim 11, wherein when the control valve is open, cooling gas flows to the brake assembly at a rate of between 30 CFM to 35 CFM for at least 6 minutes at 3 psig above ambient.

13. The braking system according to claim 12, wherein the control valve is controlled to open when the landing gear is deployed and the control valve is controlled to close when the landing gear is retracted.

14. The braking system according to claim 8, wherein the brake assembly comprises:
  a caliper member that includes:
    a gas inlet configured to couple to the supply line; and
    a manifold fluidly coupled to the gas inlet, wherein the manifold is configured to distribute the inert gas to one or more outlet ports of the caliper member; and
  a carrier member configured to be coupled to the caliper member, wherein the carrier member includes a cylindrical section configured to receive a stacked arrangement of stators and rotors, wherein the cylindrical section defines one or more interior passages configured to fluidly couple the one or more outlet ports of the caliper member to one or more outlet ports of the cylindrical section, wherein the one or more outlet ports of the cylindrical section are arranged proximate the stacked arrangement of stators and rotors to facilitate cooling the stacked arrangement of stators and rotors with the inert gas.

15. The braking system according to claim 14, wherein the caliper member defines a central opening for receiving an axle of the landing gear, wherein the manifold includes an interior passage that extends coaxially about the central opening.

16. A method for lowering a temperature of a brake assembly of landing gear of an aircraft, the method comprising:
  measuring a temperature of the brake assembly of the aircraft;
  responsive to the temperature being above an upper threshold, opening a control valve to allow inert gas from an on-board fuel inerting gas supply system of the aircraft to flow to the brake assembly;
  responsive to the temperature being at or below a lower temperature threshold, closing the control valve to cease the flow of the inert gas to the brake assembly;
  pressurizing, by a pump downstream of and in fluid communication with the on-board fuel inerting gas supply system, the inert gas; and
  storing pressurized inert gas in an accumulator downstream of the pump.

17. The method according to claim 16, further comprising:
  opening a valve that is downstream of the accumulator and configured to control a flow of the inert gas to the brake assembly to allow the inert gas to flow to the brake assembly when the landing gear of the aircraft is deployed; and
  closing the valve to prevent the flow of the inert gas to the brake assembly when the landing gear of the aircraft is retracted.

18. The method according to claim 17, wherein opening the valve further comprises communicating the inert gas to the brake assembly at a rate of between 30 CFM to 35 CFM for at least 6 minutes at 3 psig above ambient.

19. The method according to claim 16, further comprising:
  receiving the inert gas at a gas inlet of a caliper member;
  distributing, by a manifold fluidly coupled to the gas inlet, the inert gas to one or more outlet ports of the caliper member; and
  distributing, by a carrier member coupled to the caliper member, the inert gas to one or more outlet ports of a cylindrical section of the carrier member, wherein the cylindrical section is configured to receive a stacked arrangement of stators and rotors, wherein the cylindrical section defines one or more interior passages configured to fluidly couple the one or more outlet ports of the caliper member to the one or more outlet ports of the cylindrical section, wherein the one or more outlet ports of the cylindrical section are arranged proximate the stacked arrangement of stators and rotors to facilitate cooling the stacked arrangement of stators and rotors with the inert gas.

20. The method according to claim 19, wherein receiving the inert gas at the gas inlet of a caliper member comprises receiving the inert gas at a gas inlet of a caliper member that defines a central opening for receiving an axle of the landing gear, and
  wherein distributing, by the manifold comprises distributing by the manifold that includes an interior passage that extends coaxially about the central opening.

* * * * *